United States Patent Office 2,794,801
Patented June 4, 1957

2,794,801

PROCESSES OF CONVERTING Δ⁸-7-KETO-11-HYDROXY STEROIDS TO 11-KETO STEROIDS

John M. Chemerda, Metuchen, and Arthur E. Erickson, Cranford, N. J., assignors to Merck & Co., Inc., Rahway, N. J., a corporation of New Jersey No Drawing. Original application April 23, 1956, Serial No. 350,766. Divided and this application October 27, 1954, Serial No. 465,156

4 Claims. (Cl. 260—239.55)

This invention is concerned generally with steroid compounds having an oxygen atom attached to the carbon atom in the 11-position of the molecule, and with processes for preparing these 11-oxygenated steriod compounds. More particularly, it relates to 11-keto-cyclopentanopolyhydrophenanthrene compounds and with processes for preparing these compounds starting with the corresponding Δ⁹⁽¹¹⁾-7-keto-cyclopentanopolyhydrophenanthrene compound. The 11-keto-cyclopentanopolyhydrophenanthrene compounds thus obtained are valuable as intermediates in the synthesis of steroid hormones having an oxygen atom attached to the C-11 carbon atom.

This application is a division of our copending application Serial No. 350,766, filed April 23, 1953.

The 11-keto-cyclopentanopolyhydrophenanthrene compounds, subject of the present invention, have at rings B and C the following chemical structure:

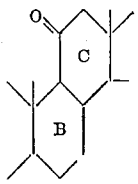

These 11 - keto-cyclopentanopolyhydrophenanthrene compounds can be prepared as follows: a Δ⁹⁽¹¹⁾-7-keto-cyclopentanopolyhydrophenanthrene compound (Compound 1 hereinbelow) is reacted with an organic peracid, whereby the double bond connecting the C-9 and C-11 carbon atoms is replaced by a 9,11-epoxide linkage, thereby forming the corresponding 7-keto-9,11-epoxy-cyclopentanopolyhydrophenanthrene compound (Compound 2); this 7-keto-9,11-epoxy-cyclopentanopolyhydrophenanthrene compound is heated, in alcoholic solution, with an alkali metal hydroxide and hydrazine to produce the corresponding 11-keto-cyclopentanopolyhydrophenanthrene compound (Compound 3). Alternatively, the 7-keto - 9,11 - epoxy - cyclopentanopolyhydrophenanthrene compound is reacted with an alcoholic alkaline solution to form the corresponding Δ⁸⁽⁹⁾-7-keto-11-hydroxy-cyclopentanopolyhydrophenanthrene compound (Compound 4) which is heated, in alcoholic solution, with an alkali metal hydroxide and hydrazine to form the corresponding 11-keto-cyclopentanopolyhydrophenanthrene compound (Compound 3).

The reactions indicated hereinabove can be chemically represented, insofar as the changes occurring in rings B and C are concerned, as follows:

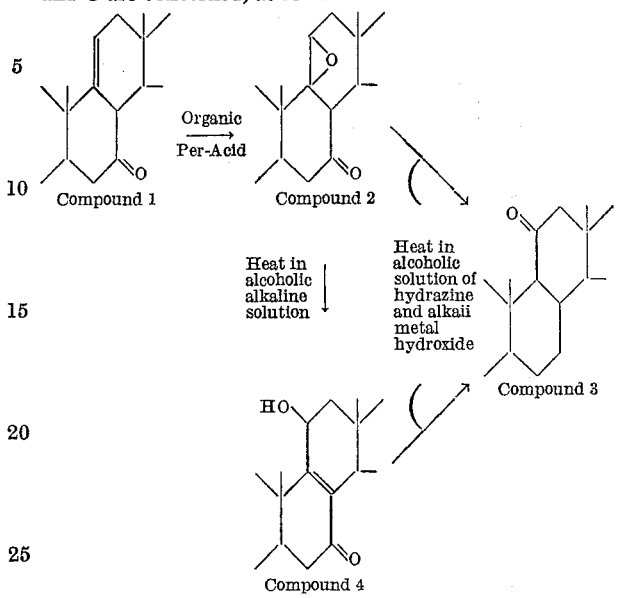

The Δ⁹⁽¹¹⁾-7-keto-cyclopentanopolyhydrophenanthrene compounds, which we ordinarily utilize as starting materials in our novel process, are those having a sterol side chain attached to the carbon atom in the 17-position of the molecule such as Δ⁹⁽¹¹⁾,²²-7-keto-ergostadiene, Δ⁹⁽¹¹⁾,²²-3-hydroxy-7-keto-ergostadiene, Δ⁹⁽¹¹⁾-7-keto-cholestene, Δ⁹⁽¹¹⁾-3-hydroxy-7-keto-cholestene, Δ⁹⁽¹¹⁾,²²-3-hydroxy-7-keto-stigmastadiene, a bile acid side chain attached to the 17-carbon atom such as Δ⁹⁽¹¹⁾-3-hydroxy-7-keto-cholenic acid, Δ⁹⁽¹¹⁾-3-hydroxy-7-keto-allocholenic acid, a degraded bile acid side chain attached to the 17-carbon atom such as Δ⁹⁽¹¹⁾-3-hydroxy-7-keto-bisnorcholenic acid, Δ⁹⁽¹¹⁾ - 3 - hydroxy-7-keto-bisnorallocholenic acid, a 17-carboxyl substituent such as Δ⁹⁽¹¹⁾-7-keto-etiocholenic acid, Δ⁹⁽¹¹⁾-7-keto-etioallocholenic acid, a 17-acetyl substituent such as Δ⁹⁽¹¹⁾-3-hydroxy-7,20-diketo-pregnene, Δ⁹⁽¹¹⁾-3-hydroxy-7,20-diketo-allopregnene, a sapogenin side chain such as Δ⁹⁽¹¹⁾-7-keto-dehydrotigogenin as well as Δ⁹⁽¹¹⁾-7-keto-cyclopentanopolyhydrophenanthrene compounds having a hydroxy substituent in the 3-position of the molecule esterified by an acyl substituent, as for example a lower alkanoyl grouping, such as an acetyl, propionyl, butyryl radical, and the like.

In preparing these Δ⁹⁽¹¹⁾-7-keto-cyclopentanopolyhydrophenanthrene compounds, we have started with the corresponding Δ⁷,⁹⁽¹¹⁾-cyclopentanopolyhydrophenanthrene compounds, certain of which, such as ergosterol-D and 3-acyloxy derivatives thereof, are described in the prior art. Other Δ⁷,⁹⁽¹¹⁾-cyclopentanopolyhydrophenanthrene compounds can be prepared, starting with readily available Δ⁵-cyclopentanopolyhydrophenanthrene compounds such as cholesterol, by treating said Δ⁵-cyclopentanopolyhydrophenanthrene compound (Compound 5 hereinbelow) with bromosuccinimide, reacting the resulting Δ⁵-7-bromo-cyclopentanopolyhydrophenanthrene compound (Compound 6) with a tertiary amine to form the corresponding Δ⁵,⁷-cyclopentanopolyhydrophenanthrene compound (Compound 7), reacting this compound with hydrogen in the presence of Raney nickel catalyst thereby selectively reducing the unsaturated linkage attached to the carbon atom in the 5-position to form the corresponding $\Delta^7$-cyclopentanopolyhydrophenanthrene compound (Compound 8) and bringing said $\Delta^7$-cyclopentanopolyhydrophenanthrene compound into intimate contact with a solution of mercuric acetate in acetic acid thereby producing the corresponding $\Delta^{7,9(11)}$-cyclopentanopolyhydrophenanthrene compound (Compound 9). The reactions indicated hereinabove may be chemically represented, insofar as the changes taking place in rings B and C are concerned, as follows:

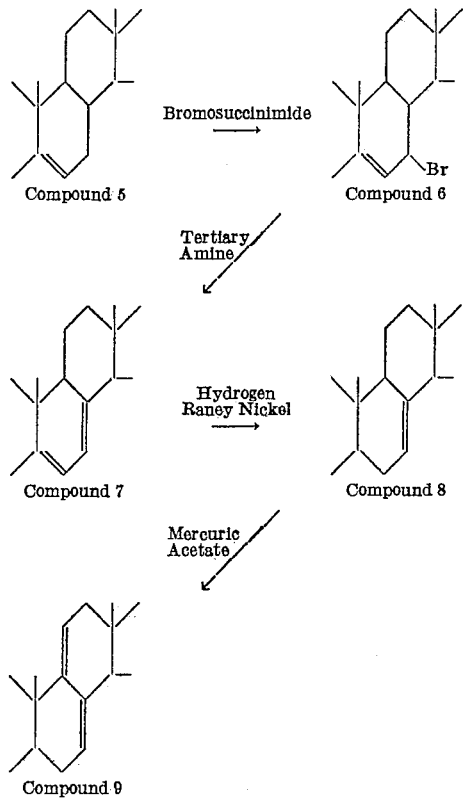

These $\Delta^{7,9(11)}$-cyclopentanopolyhydrophenanthrene compounds can then be converted to the desired $\Delta^{9(11)}$-7-keto-cyclopentanopolyhydrophenanthrene compounds (utilized as starting materials in the presently invented process) as follows: The $\Delta^{7,9(11)}$-cyclopentanopolyhydrophenanthrene compound (Compound 9) is reacted with osmium tetroxide and the intermediate osmate ester is hydrolyzed, preferably by treatment with aqueous sodium sulfite, to form the corresponding $\Delta^{9(11)}$-7,8-dihydroxy-cyclopentanopolyhydrophenanthrene compound (Compound 10). This compound is then reacted with an aqueous acidic solution at a temperature between about room temperature and 100° C. to produce the desired $\Delta^{9(11)}$-7-keto-cyclopentanopolyhydrophenanthrene compound (Compound 1).

The reactions indicated hereinabove may be chemically represented, insofar as the changes occurring in rings B and C are concerned, as follows:

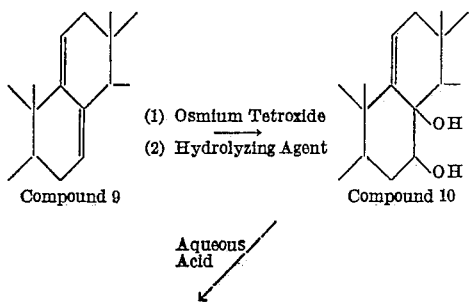

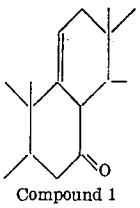

Compound 1

In accordance with the present invention the $\Delta^{9(11)}$-7-keto-cyclopentanopolyhydrophenanthrene compound is reacted with an organic per-acid, as for example, perbenzoic acid, performic acid, perphthalic acid, and the like thereby forming the corresponding 7-keto-9,11-epoxy-cyclopentanopolyhydrophenanthrene compound. This reaction is conveniently conducted by bringing the reactants together in an inert organic liquid medium, as for example, a hydrocarbon solvent such as benzene, toluene, an ethereal solvent such as dioxane, diethyl ether, and the like. The epoxylation reaction can be conducted at temperatures varying from about 0 C. to about 25° C.; the reaction time varying depending on the temperature, from about two to twenty hours. The optimum reaction time varies with the temperature; at a temperature of about 20 to 25° C., the reaction is ordinarily complete in about two to three hours; when the epoxylation is run in the cold, the reaction is ordinarily complete in about twelve to fifteen hours. The 7-keto-9,11-epoxy-cyclopentanopolyhydrophenanthrene compound produced in accordance with our procedure can be conveniently recovered by first treating the reaction solution with aqueous alkali thereby removing excess acid, and then evaporating the organic solvent therefrom. The residual material can be purified, if desired, by recrystallization from a solvent such as a lower alkanol to give the 7-keto-9,11-epoxy-cyclopentanopolyhydrophenanthrene compound in substantially pure form.

The 7 - keto - 9,11 - epoxy - cyclopentanopolyhydrophenanthrene compounds which can be prepared in accordance with this procedure include the following: $\Delta^{22}$-7-keto-9,11-epoxy-ergostene compounds such as $\Delta^{22}$-3 - hydroxy - 7 - keto - 9,11 - epoxy - ergostene, $\Delta^{22}$ - 3-acyloxy - 7 - keto - 9,11 - epoxy - ergostene, $\Delta^{22}$ - 3-alkanoyloxy - 7 - keto - 9,11 - epoxy - ergostene, $\Delta^{22}$ - 3-acetoxy - 7 - keto - 9,11 - epoxy - ergostene, $\Delta^{22}$ - 3-propionoxy - 7 - keto - 9,11 - epoxy - ergostene, 7 - keto-9,11 - epoxy - cholestane, 3-hydroxy-7-keto-9,11-epoxy-cholestane, 3 - acyloxy - 7 - keto - 9,11 - epoxy - cholestane, 3 - acetoxy - 7 - keto - 9,11 - epoxy - chloestane, $\Delta^{22}$ - 7 - keto - 9,11 - epoxy - stigmastene, $\Delta^{22}$ - 3 - hydroxy - 7 - keto - 9,11 - epoxy - stigmastene, $\Delta^{22}$ - 3-acyloxy - 7 - keto - 9,11 - epoxy - stigmastene, $\Delta^{22}$ - 3-alkanoyloxy - 7 - keto - 9,11 - epoxy - stigmastene, $\Delta^{22}$-3 - acetoxy - 7 - keto - 9,11 - epoxy - stigmastene, 7-keto - 9,11 - epoxy - cholanic acid, 3 - hydroxy - 7-keto - 9,11 - epoxy - cholanic acid, 3 - acyloxy - 7-keto - 9,11 - epoxy - cholanic acid, 3 - acetoxy - 7-keto - 9,11 - epoxy - cholanic acid, 7 - keto - 9,11-epoxy - allocholanic acid, 3 - hydroxy - 7 keto - 9,11-epoxy - allocholanic acid, 3 - acyloxy - 7 - keto - 9,11-epoxy - allocholanic acid, 3 - acetoxy-7-keto-9,11-epoxy-allocholanic acid, 7-keto-9,11-epoxy-bisnorcholanic acid, 3 - hydroxy - 7 - keto - 9,11 - epoxy - bisnorcholanic acid, 3 - acyloxy - 7 - keto - 9,11 - epoxy - bisnorcholanic acid, 3 - acetoxy - 7 - keto - 9,11 - epoxy - bisnorcholanic acid, 7 - keto - 9,11 - epoxy - bisnorallocholanic acid, 3 - hydroxy - 7 keto - 9,11 - epoxy - bisnorallocholanic acid, 3 - acyloxy - 7 - keto - 9,11 - epoxy - bisnorallocholanic acid, 3 - acetoxy - 7 - keto - 9,11 - epoxy - bisnorallocholanic acid, 7 - keto - 9,11 - epoxy - etiocholanic acid, 3 - hydroxy - 7 keto - 9,11 - epoxy - etiocholanic acid, 3 - acyloxy - 7 - keto - 9,11 - epoxy - etiocholanic acid, 3 - acetoxy - 7 - keto - 9,11 - epoxy - etiocholanic acid, 7 - keto - 9,11 - epoxy - etioallocholanic acid, 3 - hydroxy - 7 keto - 9,11 - epoxy - etioallocholanic acid, 3 - acyloxy - 7 - keto - 9,11 - epoxy - etioallocholanic acid, 3 - acetoxy - 7 - keto - 9,11 - epoxy - etioallocholanic acid, 3 - acyloxy - 7 - keto - 9,11 - epoxy - pregnane, 3-alkanoyloxy - 7 - keto - 9,11 - epoxy - pregnane, 3-acetoxy - 7 - keto - 9,11 - epoxy - pregnane, 3 - acyloxy - 7 - keto - 9,11 - epoxy - allopregnane, 3 - alkanoyloxy - 7 - keto - 9,11 - epoxy - allopregnane, 3 - acetoxy - 7 - keto - 9,11 - epoxy - allopregnane, 7 - keto - 9,11 - epoxy - tigogenin acylate, 7 - keto - 9,11 - epoxy - tigogenin alkanoate, 7 - keto - 9,11 - epoxy - tigogenin acetate, and the like.

The 7 - keto - 9,11 - epoxy - cyclopentanopolyhydrophenanthrene compound thus obtained is than heated in an alcoholic solution with an alkali metal hydroxide and hydrazine, thereby producing the corresponding 11-keto-cyclopentanopolyhydrophenanthrene compound. We ordinarily utilize, as the liquid medium for this reaction, an alcoholic solvent having a boiling point at atmospheric pressure of at least about 200° C., as for example, an ethylene glycol, propylene glycol, a polyethylene glycol such as diethylene glycol, triethylene glycol, and the like. As the alkali metal hydroxide, we ordinarily employ potassium hydroxide or sodium hydroxide, and this is preferably added to the reaction mixture in the form of a powder. The hydrazine component can be added in the form of anhydrous hydrazine, hydrazine hydrate or hydrazine salts such as hydrazine sulfate, and the like.

The reaction between the 7-keto-9,11-epoxy-cyclopentanopolyhydrophenanthrene compound, the alkali metal hydroxide and hydrazine is ordinarily conducted by heating these reactants together in contact with the alcoholic solvent at a temperature somewhat above 100° C., preferably at a temperature within the range of 105–120° C. Under these conditions, the hydrolysis of the 9,11-epoxide, formation of the 7-hydrazone and rearrangement of the intermediate $\Delta^{8(9)}$-7-phenyl-hydrazino - 11 - hydroxy - cyclopentanopolyhydrophenanthrene compound occurs after a heating period of approximately one hour, during which time the water formed in the reaction is ordinarily removed by distillation. This preliminary heating period can be shortened, if desired, by conducting this reaction resulting in hydrolysis of the epoxide, rearrangement of the $\Delta^{8(9)}$-11-hydroxy-system and formation of the 7-hydrazone at a temperature somewhat elevated above 120° C. Following this preliminary hydrolysis, the temperature of the reaction mixture is raised to approximately 190–200° C. and maintained at that temperature for a period of one-half to three hours, the extent of this heating period depending on the ease of reduction of the particular 7-ketone utilized as starting material. We ordinarily utilize a heating period of approximately thirty to sixty minutes. The 11-keto-cyclopentanopolyhydrophenanthrene compounds produced in accordance with this reaction are conveniently isolated by acidifying the cooled reaction mixture and evaporating the organic solvent. The residual material can be purified, if desired, by recrystallization from an organic solvent, as for example, a lower alkanol such as methanol. In accordance with this procedure, there are obtained 11-keto-cyclopentanopolyhydrophenanthrene compounds as, for example, $\Delta^{22}$-11-keto-ergostene compounds such as $\Delta^{22}$-3-hydroxy-11-keto-ergostene, 11-keto-cholestane compounds such as 3-hydroxy - 11 - keto-cholestane, $\Delta^{22}$ - 11 - keto-stigmastene compounds such as $\Delta^{22}$-3-hydroxy-11-keto-stigmastene, 11-keto-cholanic acid compounds such as 3-hydroxy-11-keto-cholanic acid, 3-hydroxy-11-keto-allocholanic acid, 3 - hydroxy - 11-keto-bisnorcholanic acid, 3-hydroxy-11-keto-bisnorallocholanic acid, 3-hydroxy-11-keto-etiocholanic acid, 11-keto-pregnane compounds such as 3-hydroxy - 11,20 - diketo - pregnane, 3-hydroxy-11-keto-allopregnane, 3-hydroxy-11,20-diketo-allopregnane, 11-keto-tigogenin, and the like.

In accordance with our alternate procedure, the 7-keto-9,11 - epoxy - cyclopentanopolyhydrophenanthrene compound is heated with an alcoholic solution of an alkali metal hydroxide, thereby producing the corresponding $\Delta^{8(9)}$-7-keto-11 - hydroxy - cyclopentanopolyhydrophenanthrene compound. Although alkali metal hydroxides are ordinarily used for this isomerization reaction, other alkaline materials, as for example, alkali metal carbonates, alkaline earth metal hydroxides, alkaline earth metal carbonates, and the like, can be employed if desired. It is preferred to conduct the reaction utilizing an alkali metal hydroxide such as potassium hydroxide, sodium hydroxide, and the like in conjunction with a lower alkanol such as methanol, ethanol, and the like. Where an ethanolic or methanolic solution of potassium or sodium hydroxide is used and the reaction is conducted at the reflux temperature of the mixture, the rearrangement is ordinarily complete in about one to three hours. Utilizing these alcoholic alkali solutions, hydrolyzable substituents in other portions of the molecule are also hydrolyzed; thus 3-acyloxy substituents are converted to the corresponding 3-hydroxy radicals and esters such as alkyl esters of bisnorallocholanic acid, are hydrolyzed to the free acid. When a 7-keto-8,11-epoxycyclopentanopolyhydrophenanthrene compound is subjected to these conditions of hydrolysis, there is obtained the corresponding $\Delta^{8(9)}$-7-keto-11 - hydroxy - cyclopentanopolyhydrophenanthrene compound such as $\Delta^{8(9),22}$-7-keto-11 - hydroxy - ergostadiene, $\Delta^{8(9),22}$-3,11-dihydroxy-7-keto - ergostadiene, $\Delta^{8(9)}$-7-keto-11-hydroxy-cholestene, $\Delta^{8(9)}$-3,11-dihydroxy-7-keto-coprostene, $\Delta^{8(9),22}$-3,11 - dihydroxy - 7 - keto - stigmastadiene, $\Delta^{8(9)}$-3,11-dihydroxy-7-keto-cholenic acid, $\Delta^{8(9)}$-3,11-dihydroxy-7-keto-allocholenic acid, $\Delta^{8(9)}$-3,11 - dihydroxy - 7-keto-bisnorcholenic acid, $\Delta^{8(9)}$-3,11-dihydroxy-7-keto-bisnorallocholenic acid, $\Delta^{8(9)}$-3,11 - dihydroxy - 7-keto-etiocholenic acid, $\Delta^{8(9)}$-3,11-dihydroxy-7-keto-etioallocholenic acid, $\Delta^{8(9)}$-3,11-dihydroxy-7,20-diketo-pregnene, $\Delta^{8(9)}$-3,11-dihydroxy-7,20-diketo-allopregnene, $\Delta^{8(9)}$-7 - keto - 11-hydroxy-dehydrotigogenin, and the like.

Instead of using an alcoholic alkaline solution for the isomerization reaction, the latter can be conducted by reacting the 7-keto-9,11-epoxy-cyclopentanopolyhydrophenanthrene compound with a mild hydrolyzing agent whereupon hydrolysis of the epoxy substituent occurs without affecting other hydrolyzable substituents such as ester linkages in the molecule. This partial hydrolysis reaction is conveniently conducted by reacting said 7-keto-9,11 - epoxy - cyclopentanopolyhydrophenanthrene compound, at approximately room temperature, with water or preferably with a substantially neutral aqueous solution of a water-miscible solvent such as an aqueous solution of acetone, an aqueous solution of a lower alkanol such as methanol, ethanol, and the like. This partial hydrolysis reaction is ordinarily utilized for the hydrolysis of a 7 - keto - 9,11-epoxy-cyclopentanopolyhydrophenanthrene compound containing at least one additional ester substituent, as for example, $\Delta^{22}$-3-acyloxy-7-keto-9,11-epoxy-ergostenes, $\Delta^{22}$-3-acyloxy-7-keto-9,11 - epoxy - stigmastenes, 3-acyloxy-7-keto-9,11-epoxy-cholestanes, esters of 3-acyloxy-7-keto-9,11-epoxy-cholanic acid, esters of 3-acyloxy-7-keto-9,11-epoxy-allocholanic acid, esters of 3-acyloxy-7-keto-9,11-epoxy-bisnorcholanic acid, esters of 3-acyloxy-7-keto-9,11 - epoxy - bisnorallocholanic acid, 3-acyloxy-7,20-diketo-9,11-epoxy-pregnane, 3-acyloxy-7,20-diketo - 9,11 - epoxy - allopregnane, 7 - keto - 9,11 - epoxy-tigogenin acylate, and the like. The products obtained by this selective hydrolysis of said 7-keto-9,11-epoxy-cyclopentanopolyhydrophenanthrene compounds containing at least one additional ester substituent are the corresponding $\Delta^{8(9)}$-7-keto-11 - hydroxy - cyclopentanopolyhydrophenanthrene compounds in which the additional ester substituent remains unchanged; thus, the selective hydrolysis of compounds belonging to the groups enumerated hereinabove results in the formation of $\Delta^{8(9),22}$-3-acyloxy-7-keto-11-hydroxy-ergostadiene, $\Delta^{8(9),22}$- 3 - alkanoyloxy-7-keto-11-hydroxy-ergostadiene, $\Delta^{8(9),22}$-3-acetoxy-7-keto-11 - hydroxy-ergostadiene, $\Delta^{8(9)}$-3-acyloxy-7-keto-11 - hydroxy - cholestene, $\Delta^{8(9)}$-3-alkanoxy-7-keto-11-hydroxy-cholestene, $\Delta^{8(9)}$-3-acetoxy-7-keto-11-hydroxy-cholestene, $\Delta^{8(9),22}$-3-acyloxy-7-keto-11-hydroxy-stigmastadiene, $\Delta^{8(9),22}$-3-alkanoyloxy-7-keto-11-hydroxy-stigmastadiene, $\Delta^{8(9),22}$-3-acetoxy-7-keto-11-hydroxy-stigmastadiene, $\Delta^{(9)}$-3-acyloxy-7-keto-11-hydroxy-cholenic acid, $\Delta^{8(9)}$-3-alkanoyloxy-7-keto-11-hydroxy-cholenic acid, $\Delta^{8(9)}$-3-acetoxy-7-keto-11-hydroxy-cholenic acid, $\Delta^{8(9)}$-3-acyloxy-7-keto-11-hydroxy-allocholenic acid, $\Delta^{8(9)}$-3-alkanoyloxy-7-keto-11-hydroxy-allocholenic acid, $\Delta^{8(9)}$-3-acetoxy-7-keto-11-hydroxy-allocholenic acid, $\Delta^{8(9)}$-3-acyloxy-7-keto-11-hydroxy-bisnorcholenic acid, $\Delta^{8(9)}$-3-alkanoyloxy-7-keto-11-hydroxy-bisnorcholenic acid, $\Delta^{8(9)}$-3-acetoxy-7-keto-11-hydroxy-bisnorcholenic acid, $\Delta^{8(9)}$-3-acyloxy-7-keto-11-hydroxy-bisnorallocholenic acid, $\Delta^{8(9)}$-3-alkanoyloxy-7-keto-11-hydroxy-bisnorallocholenic acid, $\Delta^{8(9)}$-3-acetoxy-7-keto-11-hydroxy-bisnorallocholenic acid, $\Delta^{8(9)}$-3-acyloxy-7-keto-11-hydroxy-etiocholenic acid, $\Delta^{8(9)}$-3-alkanoyloxy-7-keto-11-hydroxy-etiocholenic acid, $\Delta^{8(9)}$-3-acetoxy-7-keto-11-hydroxy-etiocholenic acid, $\Delta^{8(9)}$-3-acyloxy-7,20-diketo-11-hydroxy-pregnene, $\Delta^{8(9)}$-3-alkanoyloxy-7,20-diketo-11-hydroxy-pregnene, $\Delta^{8(9)}$-3-acetoxy-7,20-diketo-11-hydroxy-pregnene, $\Delta^{8(9)}$-3-alkanoyloxy-7,20-diketo-11-hydroxy-allopregnene, $\Delta^{8(9)}$-3-acetoxy-7,20-diketo-11-hydroxy-allopregnene, $\Delta^{8(9)}$-7-keto-11-hydroxy-dehydrotigogenin acylate, $\Delta^{8(9)}$-7-keto-11-hydroxy-dehydrotigogenin alkanoate, $\Delta^{8(9)}$-7-keto-11-hydroxy-dehydrotigogenin acetate.

The $\Delta^{8(9)}$-7-keto-11-hydroxy-cyclopentanopolyhydrophenanthrene compounds, thus obtained, can be converted to the corresponding 11-keto-cyclopentanopolyhydrophenanthrene compound by heating in an alcoholic solution with an alkali metal hydroxide and hydrazine, utilizing the same conditions as those set forth hereinabove in connection with the reaction of the 7-keto-9,11-epoxy-cyclopentanopolyhydrophenanthrene compounds with alkali metal hydroxides and hydrazine. Under these conditions, the $\Delta^{8(9)}$-7-keto-11-hydroxy-cyclopentanopolyhydrophenanthrene compound reacts with the hydrazine with the intermediate formation of the $\Delta^{8(9)}$-7-hydrazino-11-hydroxy-cyclopentanopolyhydrophenanthrene compound and concurrent rearrangement of the $\Delta^{8(9)}$-11-hydroxy system to a ketone; upon further heating this intermediate is reduced to give the corresponding 11-keto-cyclopentanopolyhydrophenanthrene compound.

The 11-keto-cyclopentanopolyhydrophenanthrene compounds (Compound 3 hereinabove) are conveniently converted to steroid hormones having an oxygen atom attached to the 11-carbon atom. Thus, methods are recorded in the literature for the degradation of the stigmasterol side chain, the ergosterol side chain, a cholanic acid side chain, a cholestane side chain and a sapogenin side chain to a C-17 acetyl group. Application of these methods to the appropriate 11-keto-cyclopentanopolyhydrophenanthrene compound prepared according to the present invention results in the formation of steroid hormones having an oxygen atom attached to the 11-carbon atom.

The following examples illustrate methods of carrying out the present invention but it is to be understood that these examples are given for purposes of illustration and not of limitation.

*Example 1*

A solution containing 1.24 g. of $\Delta^{9(11),22}$-3-hydroxy-7-keto-ergostadiene in 40 cc. of benzene was reacted with one molar equivalent of perbenzoic acid at about room temperature for a period of approximately three hours. The benzene reaction solution was extracted with a cold 5% aqueous potassium hydroxide solution. The benzene solution was then extracted with water and the washed solution dried over anhydrous sodium sulfate. The dry benzene reaction solution was evaporated to dryness and the residual material was repeatedly recrystallized from methanol to give substantially pure $\Delta^{22}$-3-hydroxy-7-keto-9,11-epoxy-ergostadiene; M. P. 179–181° C.; $[\alpha]_D^{23° C.}=-83°$ (chloroform); Anal. calc'd for $C_{28}H_{44}O_3$: C, 78.45; H, 10.34; Found: C, 78.29; H, 10.07.

The $\Delta^{9(11),22}$-3-hydroxy-7-keto-ergostadiene utilized as starting material can be prepared starting with ergosteryl-D epoxide in accordance with the following procedure:—
A solution containing about 17.5 g. of ergosteryl-D epoxide and about 115 cc. of 2 N aqueous sulfuric acid in 3 liters of acetone is maintained at substantially room temperature for a period of about ten minutes, and the resulting solution is evaporated in vacuo to a volume of about 250 cc. The concentrated solution is diluted with about 1200 cc. of ice water, and the precipitated material is recovered by filtration, washed with water until substantially free of acid, and dried to give $\Delta^{9(11),22}$-3-hydroxy-7-keto-ergostadiene; M. P. 142–147° C. This material is purified by chromatography on acid-washed alumina using an acetone-ether mixture for elution. The material obtained in this way is further purified by a second chromatography using a mixture of methanol-ether for elution thereby giving substantially pure $\Delta^{9(11),22}$-3-hydroxy-7-keto-ergostadiene; M. P. 153.5–154.5° C.; $[\alpha]_D^{23° C.}=-53°$ (chloroform).

*Example 2*

A solution containing 0.9 g. of $\Delta^{9(11),22}$-3-acetoxy-7-keto-ergostadiene in 40 cc. of benzene was reacted with one molar equivalent of perbenzoic acid at a temperature of about 5° C. for a period of approximately fifteen hours. The benzene reaction solution was extracted with a cold 5% aqueous potassium hydroxide solution thereby removing residual acidic material, and the benzene solution was washed with water and then dried over anhydrous sodium sulfate. The dry benzene reaction solution was evaporated to dryness in vacuo, and the residual material was recrystallized from methanol and further purified by chromatography on acid-washed alumina followed by elution of the alumina adsorbate utilizing a mixture of ethyl ether-petroleum ether to give substantially pure $\Delta^{22}$-3-acetoxy-7-keto-9,11-epoxy-ergostene; M. P. 224–226° C.; $[\alpha]_D^{23° C.}=-87°$ (chloroform). Anal.: Calc'd for $C_{30}H_{46}O_4$: C, 76.55; H, 9.86; Found: C, 76.54; H, 9.86.

The $\Delta^{9(11),22}$-3-acetoxy-7-keto-ergostadiene utilized as starting material can be prepared, starting with ergosteryl-D acetate epoxide, in accordance with the following procedure: A solution containing about 15 g. of ergosteryl-D acetate epoxide and about 115 cc. of 2 N aqueous sulfuric acid in 3 liters of acetone is maintained at substantially room temperature for a period of about ten minutes, and the resulting solution is evaporated in vacuo to a volume of about 250 cc. The concentrated solution is diluted with about 1200 cc. of ice water, and the precipitated material is recovered by filtration, washed with water until substantially free of acid, and dried to give $\Delta^{9(11),22}$-3-acetoxy-7-keto-ergostadiene. This material is purified by chromatography on acid-washed alumina using an acetone-ether mixture for elution. The material obtained in this way is further purified by chromatography using a mixture of methanol-ether for elution thereby giving substantially pure $\Delta^{9(11),22}$-3-acetoxy-7-keto-ergostadiene; M. P. 176–177° C.

*Example 3*

A solution containing 0.34 g. of $\Delta^{22}$-3-hydroxy-7-keto-9,11-epoxy-ergostene and 7 cc. of a 1 N methanolic solution of potassium hydroxide in 30 cc. of methanol was heated at reflux temperature for a period of approximately one hour. The reaction solution was evaporated to dryness in vacuo and the residual material triturated with 100 cc. of ice water. The precipitated material was recovered by filtration, washed free of alkali with water, air-dried and recrystallized from acetone to give substantially pure $\Delta^{8(9),22}$-3,11-dihydroxy-7-keto-ergostadiene; M. P. 214–216° C.; $[\alpha]_D^{23° C.}=-7°$ (chloroform); $\lambda$ max. 2540 A.; E% 201.

Example 4

A mixture containing 0.428 g. of $\Delta^{8(9),22}$-3,11-dihydroxy-7-keto-ergostadiene, 0.28 g. of powdered potassium hydroxide, 0.25 cc. of hydrazine hydrate and 5 cc. of diethylene glycol, was heated at a temperature of approximately 110–120° C. for a period of about one hour, and the resulting mixture was heated at a temperature of approximately 195–200° C. for a period of about one-half hour. The reaction mixture was cooled, diluted with 25 g. of ice water, and the resulting aqueous mixture was acidified with sulfuric acid. The precipitated material was recovered by filtration, washed free of acid with water, dried and recrystallized from methanol to give substantially pure $\Delta^{22}$-3-hydroxy-11-keto-ergostene; M. P. 169–171° C.; $[\alpha]_D^{23°\ C.} = +24.5°$ (chloroform).

Example 5

A solution containing 0.428 g. of $\Delta^{22}$-3-hydroxy-7-keto-9,11-epoxy-ergostene, and 7 cc. of 1 N methanolic potassium hydroxide in 30 cc. of methanol was heated at approximately reflux temperature for a period of about one hour, and the reaction solution was evaporated to dryness in vacuo. The residual material was mixed with 5 cc. of diethylene glycol, 0.28 g. of powdered potassium hydroxide and 0.25 cc. of hydrazine hydrate, and the resulting mixture was heated at a temperature of about 110–120° C. for a period of approximately one hour during which time water was distilled from the reaction mixture; the resulting mixture was then heated at a temperature of about 195–200° C. for a period of approximately one-half hour. The reaction mixture was cooled, diluted with about 25 g. of ice water, and acidified with sulfuric acid. The precipitated material was recovered by filtration, washed free of acid with water, dried, and recrystallized from methanol to give substantially pure $\Delta^{22}$-3-hydroxy-11-keto-ergostene; M. P. 169–171° C.

Example 6

To a mixture of 5 cc. of diethylene glycol, 0.28 g. of powdered potassium hydroxide and 0.25 cc. of hydrazine hydrate was added 0.428 g. of $\Delta^{22}$-3-hydroxy-7-keto-9,11-epoxy-ergostene. The resulting mixture was heated at a temperature of approximately 110–120° C. for a period of approximately one hour during which time the water formed was removed by distillation. The reaction mixture was then heated to a temperature of approximately 195–200° C. and maintained at that temperature for a period of about thirty minutes. The reaction mixture was then cooled to about room temperature, 25 g. of ice water was added, and the solution was acidified with sulfuric acid. The precipitated solid material was recovered by filtration, washed with water, dried, and recrystallized from methanol to give substantially pure $\Delta^{22}$-3-hydroxy-11-keto-ergostene.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting a $\Delta^{8(9)}$-7-keto-11-hydroxy-cyclopentanopolyhydrophenanthrene compound, selected from the group which consists of $\Delta^{8(9),22}$-3,11-dihydroxy-7-keto-ergostadiene, $\Delta^{8(9)}$-7-keto-11-hydroxy-dehydrotigogenin, and 3-lower alkanoyl esters thereof, with hydrazine in strongly alkaline solution to produce an 11-keto-cyclopentanopolyhydrophenanthrene compound, selected from the group which consists of $\Delta^{22}$-3-hydroxy-11-keto-ergostene and 11-keto-tigogenin.

2. The process which comprises reacting $\Delta^{8(9)}$-7-keto-11-hydroxy-dehydrotigogenin with hydrazine in a medium comprising alcoholic alkali thereby forming 11-keto-tigogenin.

3. The process which comprises reacting $\Delta^{8(9),22}$-3,11-dihydroxy-7-keto-ergostadiene with hydrazine hydrate and potassium hydroxide in a medium comprising diethylene glycol thereby forming $\Delta^{22}$-3-hydroxy-11-keto-ergostene.

4. The process which comprises reacting $\Delta^{8(9),22}$-3-acetoxy-7-keto-11-hydroxy-ergostadiene with hydrazine hydrate and potassium hydroxide in a medium comprising diethylene glycol thereby forming $\Delta^{22}$-3-hydroxy-11-keto-ergostene.

References Cited in the file of this patent

J. American Chem. Soc., May 1951, pp. 2396–97.
Stork: J. Amer. Chem. Soc., vol. 73, pp. 3546–47.